United States Patent [19]
Tomei

[11] Patent Number: 4,592,436
[45] Date of Patent: Jun. 3, 1986

[54] SOLAR POWERED VEHICLE

[76] Inventor: Edmardo J. Tomei, 1155 Riviera Dr., Flint, Mich. 48507

[21] Appl. No.: 409,420

[22] Filed: Aug. 19, 1982

[51] Int. Cl.$^4$ ............................................. B60L 9/00
[52] U.S. Cl. .................................. 180/2.2; 136/245; 180/65.3
[58] Field of Search ............... 180/2.1, 2.2, 65.3; 323/906; 136/243, 244, 245, 251, 291; 126/417, 426, 450

[56] References Cited

U.S. PATENT DOCUMENTS

| | | | |
|---|---|---|---|
| 3,817,477 | 6/1974 | Luther | 244/155 |
| 3,943,726 | 3/1976 | Miller | 62/2 |
| 4,090,577 | 5/1978 | Moore | 180/44 M |
| 4,141,425 | 2/1979 | Treat | 180/65 DD |
| 4,148,163 | 4/1979 | Chenin | 244/173 |
| 4,181,188 | 1/1980 | Dessert . | |
| 4,421,943 | 1/1983 | Withjack | 136/246 |

Primary Examiner—John J. Love
Assistant Examiner—Joseph G. McCarthy
Attorney, Agent, or Firm—Basile Weintraub Hanlon

[57] ABSTRACT

A solar powered vehicle utilizing incident solar radiation to charge storage batteries for energizing an electric motor mounted within the vehicle. The solar panel comprises a lower panel mounted on an exterior surface of the vehicle and first and second upper panels pivotally connected on opposed sides to the lower panel and movable between a first inboard position overlaying the lower panel and a second outboard position in-line with the lower panel in which the lower panel and the first and second upper panels are disposed for receiving incident solar radiation. The first and second upper panels are releasably interlockable with the lower panel in a secure, spaced-apart position when the first and second upper panels are disposed in the first inboard position overlying the lower panel. A plurality of solar panels may be provided on the roof, hood and/or trunk of the vehicle.

4 Claims, 7 Drawing Figures

SOLAR POWERED VEHICLE

BACKGROUND OF THE INVENTION

1. Field of The Invention

This invention relates, in general, to electric powered vehicles and, more specifically, to electric powered vehicles wherein solar radiation is utilized to generate the electricity needed to power the vehicle.

2. Description of The Prior Art

In view of the steadily decreasing world wide supply of oil resources, alternate source of energy have been investigated for possible use in powering vehicles, such as automobiles, trucks, buses, etc. Alternate sources of energy also have been investigated as a means for reducing pollutant levels in large cities, a major portion of which is emitted from the use of oil derived fuels, such as gas, diesel, etc., in today's vehicles.

Such investigations have focused on electrical powered vehicles in view of the ready supply of electricity and the non-polluting nature inherent with electrical motors.

In an electric powered vehicle, a series of storage batteries are mounted within the vehicle for providing the electricity needed to energize an electric motor connected to the drive train of the vehicle. A large number of storage batteries are typically employed to provide sufficient electricity to propel the vehicle over a wide range before requiring recharging. Previously devised electric powered vehicles are typically recharged by connecting the batteries through a suitable recharging device to a source of electrical energy such as the electrical circuit in a building or residential home. During recharging, which can take several hours, the vehicle is completely inoperative.

Previously constructed batteries are typically heavy and are required in large numbers in order to provide an adequate driving range between recharging periods. These factors are opposed to the recent trend towards smaller, lighter vehicles and have impeded the deployment of large numbers of electric powered vehicles pending further advances in battery storage capacity design and weight reduction. Furthermore, such batteries still utilize electricity generated by the conventional means, such as fossil fuels, hydro, nuclear, etc., which adds to the expense of recharging the batteries and further inhibits the rapid deployment of large numbers of electric powered vehicles.

In an attempt to overcome the problems attendent the necessity for connecting the batteries in an electric powered vehicle to a source of electricity for recharging, solar panels have been mounted on vehicles to partially recharge the batteries during the operation of the vehicle so as to increase the operating range of the vehicle and to decrease battery recharging time. These attempts have met with limited success since previously devised solar panels provide only minimal recharging capacity due to the small amount of external space available on vehicles for mounting the panels. This is particularly true in view of smaller vehicles being designed and produced today.

Thus, it would be desirable to provide an electric powered vehicle which overcomes the problems of previously devised electric powered vehicles. It would also be desirable to provide an electric powered vehicle in which solar radiation is utilized to generate the electricity needed to power the vehicle. Finally, it would be desirable to provide an electric powered vehicle in which a solar collector having a large surface area may be mounted on the vehicle to extend the driving range of the vehicle and decrease battery recharging time.

SUMMARY OF THE INVENTION

There is disclosed herein a unique solar powered vehicle utilizing electrical power converted from incident solar radiation. The solar radiation is converted by a solar panel to electrical energy which is used to charge storage batteries which, in turn, provide electricity for energizing the electric motor of the vehicle. The solar panel comprises a lower panel adapted to be mounted on an exterior surface of the vehicle. The lower panel is formed with a pluarlity of interconnected photovoltaic cells. A pair of first and second upper panels, each also formed of photovoltaic cells, are pivotally mounted on opposed sides to the lower panel and are movable between a first inboard position overlaying the lower panel and a second outboard position in line with the lower panel in which the lower panel and the first and second upper panels are disposed for receiving incident solar radiation.

The solar cells in the lower and the first and second upper panels are connected through a voltage regulator to the storage batteries for supplying electrical energy to the batteries.

The lower and first and second upper panels are provided with releasable interlock means for releasably interconnecting the lower panel and the first and second panels in a spaced-apart, secure manner when the first and second upper panels are positioned in the first inboard position overlaying the lower panel. Preferably, the interlocking means comprises interlocking tongue and groove connections mounted on the exterior frames surrounding the lower and the first and second upper panels.

The solar panel of the present invention may be employed on any exterior surface of the vehicle, such as the roof, hood and/or trunk. When the vehicle is not in use, the first and second upper panels of each solar panel may be pivoted to the second outboard position so as to provide a large surface area for receiving incident solar radiation. This provides increased electrical energy for the batteries which substantially reduces the recharging time of the batteries and extends the driving range of the vehicle.

The solar panel of the present invention overcomes many of the problems encountered with previously devised electric powered vehicles employing solar panels for converting solar radiation into usable electrical energy. The solar panel of the present invention substantially increases the available amount of surface area of a solar panel mounted on a conventional vehicle so as to significantly reduce the recharging time of the storage batteries mounted within the vehicle and, also, to increase the driving range of the vehicle. At the same time, the solar panels may be moved to a first or storage position in which the first and second upper panels overlay the lower panel for normal vehicle operation.

The solar panel of the present invention utilizes available solar radiation and converts the incident solar radiation to usable electrical energy which is stored in the batteries. This negates the need for connecting the storage batteries to other sources of electrical energy, such as that provided in buildings or houses, and reduces the amount of time that the storage batteries must be connected to such alternate sources of electrical energy if rapid recharging is necessary.

BRIEF DESCRIPTION OF THE DRAWING

The various features, advantages and other uses of the present invention will become more apparent by referring to the following description and drawing in which:

FIG. 3 is a cross sectional view generally taken along line 3—3 in FIG. 1;

FIG. 4 is a cross sectional view generally taken along line 4—4 in FIG. 1;

DESCRIPTION OF THE PREFERRED EMBODIMENTS

Figure 1:
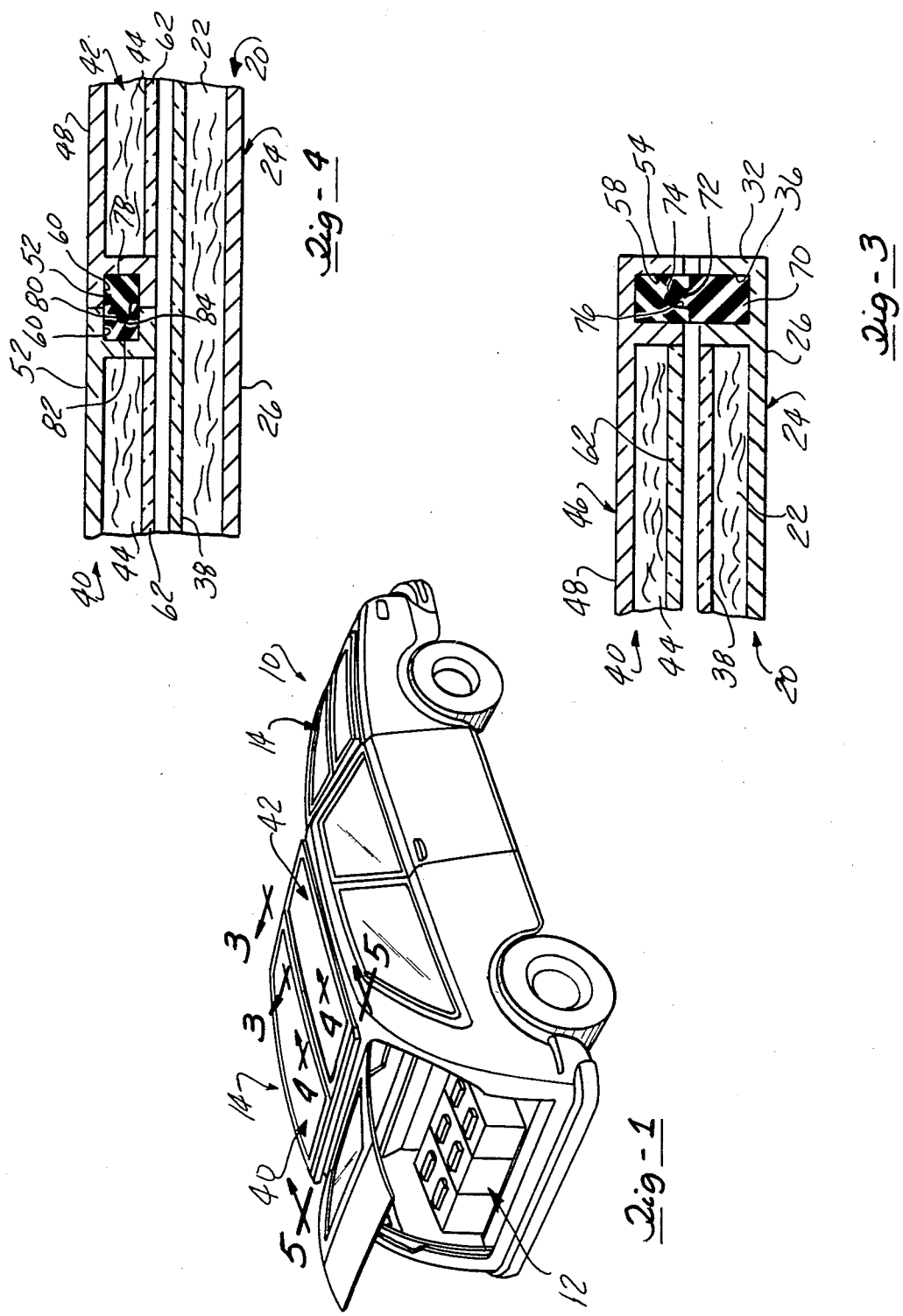
FIG. 1 is a perspective view of a solar powered vehicle constructed in accordance with the teachings of the present invention.

Throughout the following description and drawing, an identical reference number is used to refer to the same component shown in multiple figures of the drawing.

Referring initially to FIG. 1, there is illustrated a solar powered vehicle 10 constructed in accordance with the teachings of the present invention. The solar powered vehicle 10 is a conventional electric powered vehicle having an electric motor, not shown, mounted therein which is connected to the vehicle drive train for propelling the vehicle. The electric motor receives electrical energy from a plurality of parallel connected storage batteries 12 which are mounted within the vehicle 10. The storage batteries 12 may be recharged by connection through a conventional battery recharger, not shown, to a suitable source of electrical energy, such as an electrical outlet connected to the electrical circuit within a building or residential home.

According to a preferred embodiment of the present invention, the vehicle 10 is provided with solar panel means 14 which are operative to convert incident solar radiation into electrical energy. The solar panel means 14 are electrically connected to the storage batteries 12 and are operative to supply electrical current thereto for recharging the batteries 12.

Figure 2:
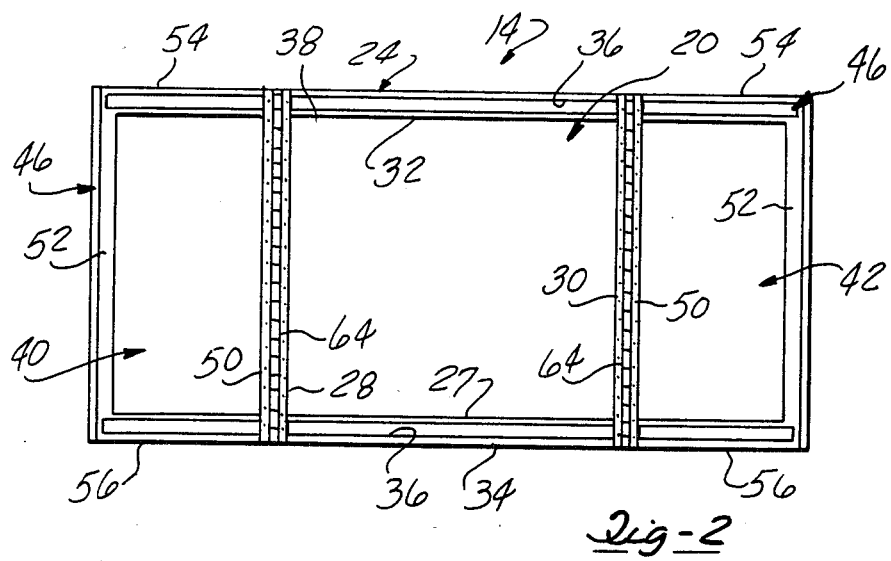
FIG. 2 is a plan view of a solar panel mounted on the vehicle shown in FIG. 1.

As shown in FIG. 1, and in greater detail in FIGS. 2 and 3, the solar panel means 14 is mounted on any convenient, substantially horizontal, exterior surface of the vehicle. Thus, the solar panel means 14 may be mounted on the roof, hood, and/or trunk or rear deck of the vehicle 10. In each mounting position, the solar panel means 14 is identically constructed and only differs in size so as to conform the solar panel means 14 to the size and configuration of the exterior surface on the vehicle 10 on which it is mounted. As such, a detailed construction of only one solar panel means 14 will be provided hereafter.

In general, the solar panel means 14 is operative to convert solar radiation incident thereon into electrical energy. The solar panel means 14 comprises a series of photovoltaic cells which are arranged in a thin layer. As is commonly known, a photovoltaic cell is formed of an amorphous semi-conductor material, such as silicon. As the interconnection of the individual cells is well known and is not germane to the present invention, details of such interconnection will not be described herein. It will be understood, however, that such individual photovoltaic cells are interconnected so as to provide through a common output cable a constant flow of electrical energy.

As shown in FIGS. 2, 3 and 4, the solar panel means 14 includes a lower panel 20 which is sized to substantially cover the exterior body surface panel of the vehicle 10 to which it is mounted. The lower panel 20 includes a thin layer or photovoltaic cells 22 which are mounted in a suitably formed lower frame 24.

The lower frame 24 is formed with a planar base 26, peripheral upturned side flanges 28 30, 32 and 34. The side flanges 28, and 30 are solid; while the side flanges 32 and 34 include a channel-like groove 36, the purpose of which will be described in greater detail hereafter.

A thin transparent cover member 38 extends between the upper ends of the side flanges 28, 30, 32 and 34 and is formed connected thereto in a moisture-tight seal. The cover member 38 is spaced from the base 26 of the lower frame 24 to define an interior space wherein the photovoltaic cells 22 are disposed.

Preferably, the lower frame 24 is formed of a suitable lightweight metallic material, such as aluminum. The lower frame 24 is mounted to the exterior surface of the vehicle 10 by suitable fastening means, not shown.

The solar panel means 14 of the present invention further includes at least one and preferably two upper panels 40 and 42, respectively. Each of the first and second upper panels 40 and 42 includes a layer of photovoltaic cells 44 which are mounted in an upper frame 46.

Each of the upper frames 46 is identically constructed and includes a base 48 and peripheral, upturned side flanges 50, 52, 54 and 56. Side flange 50 is solid; while side flanges 54 and 56 are formed with outwardly opening channel-like grooves 58. Side flange 52 is formed with a sideways-extending channel-like groove 60. A thin transparent cover member 62 extends between and is sealingly joined to the upper ends of the side flanges 50, 52, 54 and 56 of each upper frame 46 and is spaced from the base 48 to define an interior space wherein the photovoltaic cells 44 are disposed.

Each of the upper panels 40 and 42 is pivotally connected along side flange 50 to opposed side flanges 28 and 30, respectively, of the lower frame 24. Any conventional hinging means may be employed to pivotally connect the first and second upper panels 40 and 42 to the lower frame 24. Preferably, a continuous piano-type hinge 64 is employed, one leg of which is connected to a side flange of the lower frame 24 and the other leg of which is connected to the side flange 50 of the upper frame 46 of the upper panel 40 or 42. In this manner, each of the first and second upper panels 40 and 42 is pivotally movable between a first inboard position, shown in FIGS. 1, 3 and 4, in which the first and second upper panels 40 and 42 overlay and cover the lower panel 20 and a second outboard position, shown in FIG. 2, in which the first and second upper panels 40 and 42 are disposed substantially horizontally in-line with the lower panel 20. In the second outboard position, the first and second upper panels 40 and 42 and the lower panel 20 are disposed for receiving incident solar radiation. Further, in this position, the first and second upper panels 40 and 42 and the bottom panel 20 define an enlarged surface area for receiving incident solar radiation.

The solar panel means 14 of the present invention is further provided with releasable interlock and sealing means mounted on the lower panel 20 and the first and second upper panels 40 and 42 for releasably interconnecting the lower panel 20 with the first and second upper panels 40 and 42 in a secure, spaced-apart relationship when the first and second upper panels 40 and 42 are disposed in a first, inboard position overlaying the bottom panel 20. Preferably, the interlocking means comprises interlocking tongue and groove members.

As shown in FIG. 3, the side flanges 32 and 34 of the lower frame 23 24 are formed with a recessed channular groove 36. A resilient seal member 70 is mounted within the groove 36 and includes an upwardly extending tongue or projection 72 which extends upward above the ends of the side flanges 32 and 34.

The corresponding side flanges 54 and 56 of each upper panel 40 and 42 also include a recessed channular groove 58. A resilient member 74 is mounted within the groove 58 and is formed with a groove 76 having a shape complimentary to the shape of the tongue 72 on member 70. The tongue 72 and groove 76 are adapted for releasable interconnection. In this manner, the first and second upper panels 40 and 42 may be secured to the lower panel 20 when in the first inboard position so as to prevent movement thereof during operation of the vehicle 10. Furthermore, when in the interlocked position, the interlocking tongue and groove projections 72 and 76 seal the interior of the solar panel means 14 from dirt, moisture, etc., thereby preventing damage to the solar panel means 14. In addition, when in this position, the first and second panels means 40 and 42 are spaced from the opposed surface of the lower panel 20 so as to prevent damage to the transparent surfaces covering the photovoltaic cells mounted within each panel. The interlocking means is releasable so as to enable the first and second panels 40 and 42 to be pivoted to the second outboard position shown in FIG. 2.

As depicted in FIG. 4, the side flanges 52 of each upper panel 40 and 42 includes a recessed groove 60. A resilient seal member 78 is mounted with the groove 60 of one of the upper panels, such as upper panel 42, and is formed with an outwardly-extending tongue or projection 80. A similar resilient member 82 is mounted in the groove 60 in the other upper panel 40 and is formed with an inwardly extended groove 84 having a shape complementary to the shape of the tongue 80. The tongue 80 and groove 84 are adapted for releasably interlocking when the upper panels 40 and 42 are in the first position shown in FIGS. 1, 3 and 4 and form a moisture-proof seal therebetween.

As noted previously, the upper panels 40 and 42 are pivotally movable with respect to the lower panel 20. This can be implemented manually in which case hand grips, not shown, are affixed to each of the upper panels 40 and 42 to provide a convenient means for pivoting the upper panels 40 and 42 between the first and second positions.

Power means may also be employed for automatically pivoting the upper panels 40 and 42.

Figure 5:
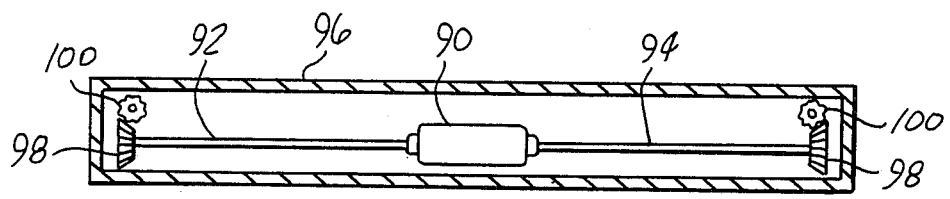
FIG. 5 is a cross sectional view generally taken along line 5—5 in FIG. 1.

According to a preferred embodiment, the power means comprises a reversible motor 90, shown in FIG. 5, having a pair of outwardly extending output shafts 92 and 94. The motor 90 may constitute an electric motor which is connected to the vehicle batteries 12 for power. The motor 90 is mounted in a sealed housing 96 which is situated at the rear of the solar panel means 14. The motor 90 is positioned such that the output shafts 92 and 94 extends transversely across the vehicle 10.

The outward ends of the output shafts 92 and 94 are operably coupled to the hinge means 64 connecting the panels 40 and 42 to the lower panel 20. According to a preferred embodiment, a first gear 98, such as a helical gear, is mounted on the end of each output shaft 92 and 94. A second gear 100 which meshes with and is driven by the first gear 98 is mounted on an extention of the shaft of the piano-type hinge 64 utilized in the present invention.

Suitable control switches, such as a two-position switch, not shown, is mounted in the vehicle 10 and is connected to the motor 90 for driving the motor 90 in either forward or reverse directions. Rotation of the output shafts 92 and 94 of the motor 90 is converted by the first and second gears 98 and 100 to rotation of the hinge means 64 which pivots the upper panels 40 and 42 between the first and second positions described above.

Although not shown, a suitable electrical switch interlock circuit may be incorporated and mounted for interconnection between the lower panel 20 and the first and second upper panels 40 and 42 to insure that the first and second upper panels 40 and 42 are secured in the first in board position during operation of the vehicle 10. The electrical interlock system may be provided with a light or buzzer mounted on the dashboard of the vehicle 10 so as to provide an indication that the first and second upper panels 40 and 42 are securely stored in the first inboard position for safe operation of the vehicle 10 and to prevent damage to the solar panels. For aesthetic purposes, the exterior surface of the base 48 of each upper panel frame 46 may be painted to match the color of the vehicle 10 or covered with a decorative material, such as a layer of vinyl. The frame 46 may be manufactured to blend with the contour and periphery of the vehicle roof and/or hood and trunk when the upper panels 40 and 42 are in the first inboard position overlaying the lower panel 20.

Figure 6:
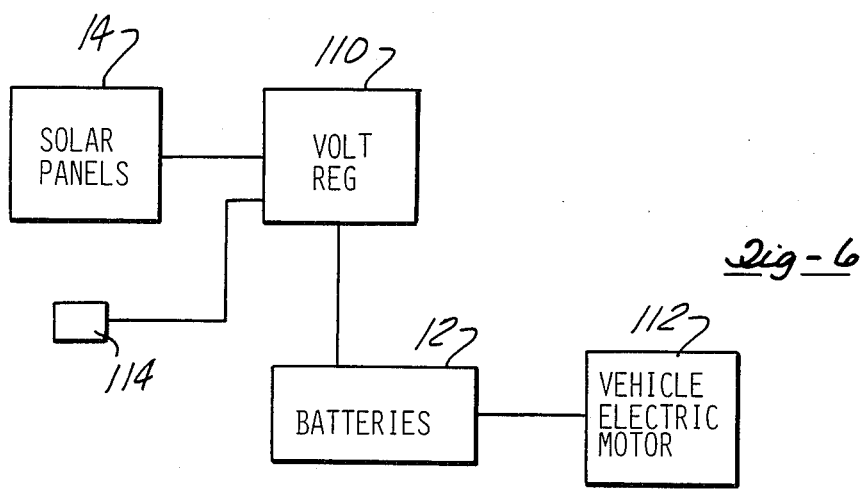
FIG. 6 is a schematic block diagram of the electrical system utilized in the solar powered vehicle of the present invention.

As shown schematically in FIG. 6, the solar panel means 14 are electrically connected through a voltage regulator 110 to the storage batteries 12. The batteries 12, as is conventional, are electrically connected to an electric motor 112 which, when energized, propels the vehicle 10.

The storage batteries 12 may also be connected through a suitable plug 114 mounted on the vehicle 10 to an alternate source of electrical energy, such as the electrical power circuit within a building or a residential house for recharging the batteries 12 when the vehicle is not in use. In this configuration, the solar panel means 14 acts as a supplemental source of energy for the storage batteries 12 which extends the driving range of the vehicle 10 and reduces the recharging time for the storage batteries 12.

Figure 7:
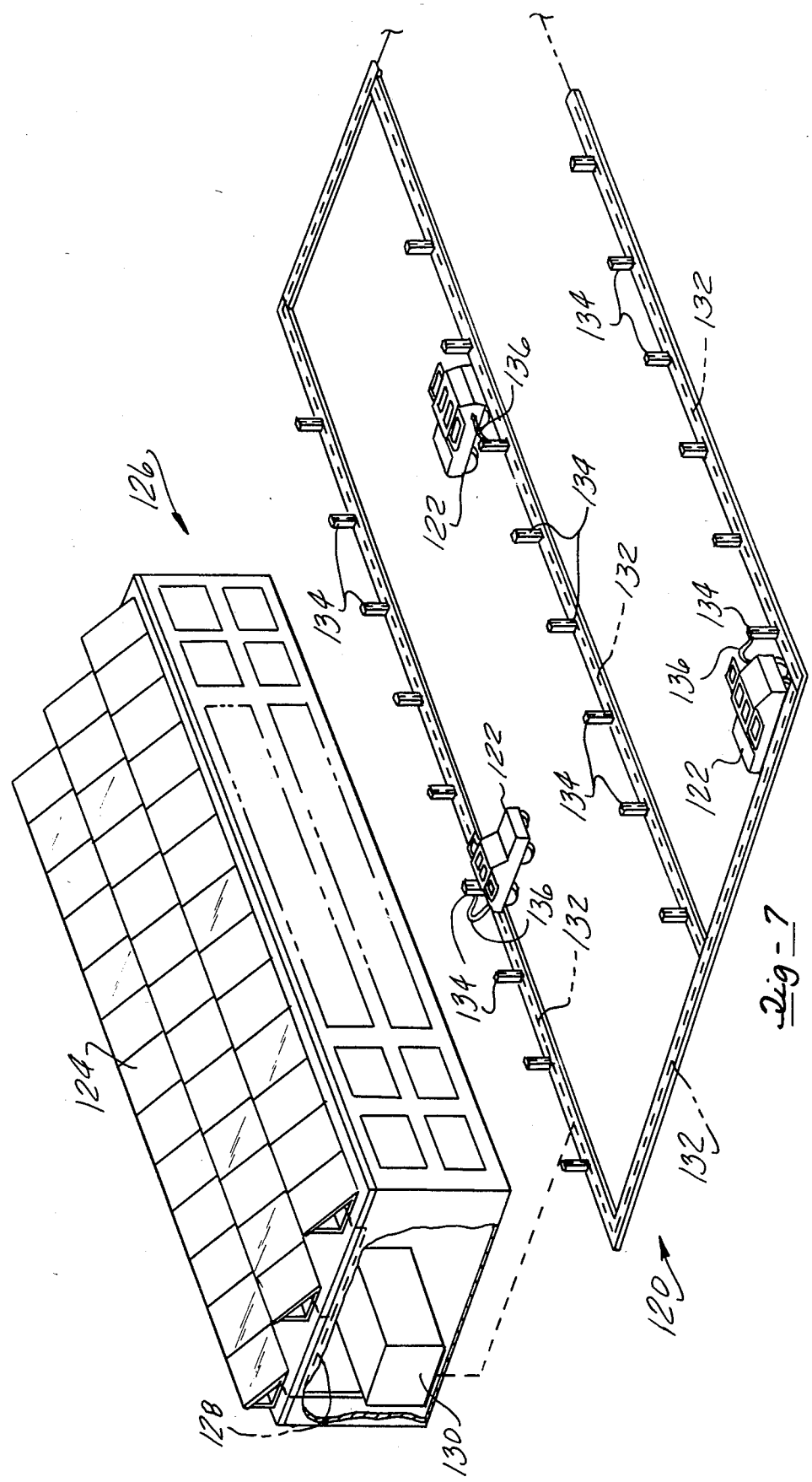
FIG. 7 is a pictorial representation of a large scale solar powered electrical vehicle recharging system.

Referring now to FIG. 7, there is illustrated a large-scale solar powered system 120 for recharging a plurality of vehicles 122, which are electrically powered and may be provided with the solar panel means 14 described above. In this system, a plurality of solar panels 124, each containing amorphous semiconductor type photovoltaic cells, are mounted to receive solar radiation. The solar cells 124 are angularly positioned to receive the maximum amount of solar radiation and, preferably, are mounted on the roof of a building 126.

Power conductors 128 connect the solar cells 124 to a large scale storage battery means 130 housed within the building 126. Electrical power, as required, is transmitted over electrical conductors 132 to a plurality of individual vehicle charging terminals 134. The terminals 134 are preferably in the form of a post having a cable 136 attached thereto. A plug, not shown, is attached to the end of the cable 136 and mates with the plug 114 mounted on each vehicle 122 for connecting each vehicle to the large-scale solar power system.

Thus, there has been disclosed a solar powered vehicle which overcomes many of the problems encountered with previously devised electric power vehicles utilizing solar panel means for providing electrical energy used to propel the vehicle. The solar panel utilized in the vehicle of the present invention provides an increased solar radiation collection surface area which provides generates added amounts of electrical energy for recharging the storage batteries in the vehicle. This not only extends the driving range of the vehicle but substantially reduces the recharging time of the batteries when the batteries are connected to an alternate source of electrical energy, such as the electrical circuit in a building or a residential home.

What is claimed is:

1. A solar powered vehicle comprising:
   an electric motor for propelling the vehicle;
   a plurality of electric storage batteries mounted within the vehicle for providing electrical power to the electric motor; and
   solar panel means mounted on the exterior of the vehicle and electrically connected to the storage batteries for converting incident solar radiation into electricity for charging the batteries;
   the solar panel means comprising a lower panel mounted on the vehicle and at least a first upper panel pivotally mounted on a side of the lower panel and movable between a first inboard position overlaying the lower panel and a second outboard position in-line with the lower panel in which the lower panel and the first upper panel are disposed for receiving incident solar radiation, and
   releasable interlocking means, mounted on the lower panel and the first upper panel, for releasably interconnecting the lower panel and the first upper panel in a secure, spacedapart position when the first upper panel is disposed in a first inboard position overlaying the lower panel.

2. The solar powered vehicle of claim 1 wherein the releasable interlocking means comprises:
   interlocking tongue and groove connections mounted on certain of the exterior sides of the lower and first upper panels.

3. A solar panel assembly for mounting on the exterior of a vehicle having an electrical motor for powering the vehicle and a plurality of electric stroage batteries for providing electrical power to the electric motor, the solar panel assembly comprising:
   a lower panel adapted to be secured to an exterior surface on the vehicle; and
   first and second upper panels pivotally mounted on opposed sides of the lower panel and movable between a first inboard position overlaying the lower panel and a second outboard position in-line with the lower panel in which the lower panel and the first and second upper panels are disposed for receiving incident solar radiation;
   each of the lower panel and the first and second upper panels including a plurality of interconnected photovoltaic cells, and
   releasable interlocking means for interlocking the lower panel and each of the first and second upper panels when the first and second upper panels are disposed in the first inboard position overlaying the lower panel.

4. The solar panel assembly of claim 3 wherein the interlocking means comprises interlocking tongue and groove connections mounted on certain side edges of the lower and the first and second upper panels.

* * * * *